(12) United States Patent
Gibson

(10) Patent No.: US 6,233,867 B1
(45) Date of Patent: May 22, 2001

(54) LANDSCAPE CONTROL FABRIC WITH MUCILAGE

(76) Inventor: Joseph L. Gibson, 10535 Aviary Dr., Alpharetta, GA (US) 30022

( * ) Notice: Subject to any disclaimer, the term of this patent is extended or adjusted under 35 U.S.C. 154(b) by 0 days.

(21) Appl. No.: 09/362,353

(22) Filed: Jul. 27, 1999

(51) Int. Cl.$^7$ .......................... C09K 17/00; A01G 17/00
(52) U.S. Cl. ................................. 47/9; 47/25; 47/56
(58) Field of Search ..................... 47/56, 25, 23, 47/9

(56) References Cited

U.S. PATENT DOCUMENTS

| | | | |
|---|---|---|---|
| 1,846,274 | * | 2/1932 | Otwell ........................... 47/56 |
| 3,889,417 | * | 6/1975 | Wood et al. ................. 47/56 X |
| 4,584,790 | * | 4/1986 | Gaughen ....................... 47/56 |
| 4,794,726 | * | 1/1989 | Fawcett et al. ................. 49/9 |
| 4,941,282 | * | 7/1990 | Milstein ..................... 47/56 X |
| 5,205,068 | * | 4/1993 | Solomou ....................... 47/56 |
| 5,226,255 | * | 7/1993 | Robertson ..................... 47/56 |
| 5,417,010 | * | 5/1995 | Ecer ........................... 47/56 |
| 5,421,123 | * | 6/1995 | Sakate et al. .................. 47/56 |
| 5,555,674 | * | 9/1996 | Molnar et al. .................. 47/56 |

FOREIGN PATENT DOCUMENTS

| | | | |
|---|---|---|---|
| 01263319A | * | 10/1989 | (JP) . |
| 4022413A | * | 1/1992 | (JP) . |
| 08149921A | * | 6/1996 | (JP) . |

* cited by examiner

Primary Examiner—Peter M. Poon
Assistant Examiner—Jeffrey L. Gellner
(74) Attorney, Agent, or Firm—William B. Noll

(57) ABSTRACT

A landscaping control fabric to allow gardeners and landscapers to custom design various outdoor planting projects by the use of a unique landscaping control fabric containing plural layers of time releasing growth enhancing and control products. Such products, contained on mucilage media on a water pervious mesh layer, may be selected from the group consisting of fertilizers, fungicides, water saver crystals, vegetation foods, pre-emergent weed killers, and post-emergent weed killers, are placed about selected vegetation.

5 Claims, 2 Drawing Sheets

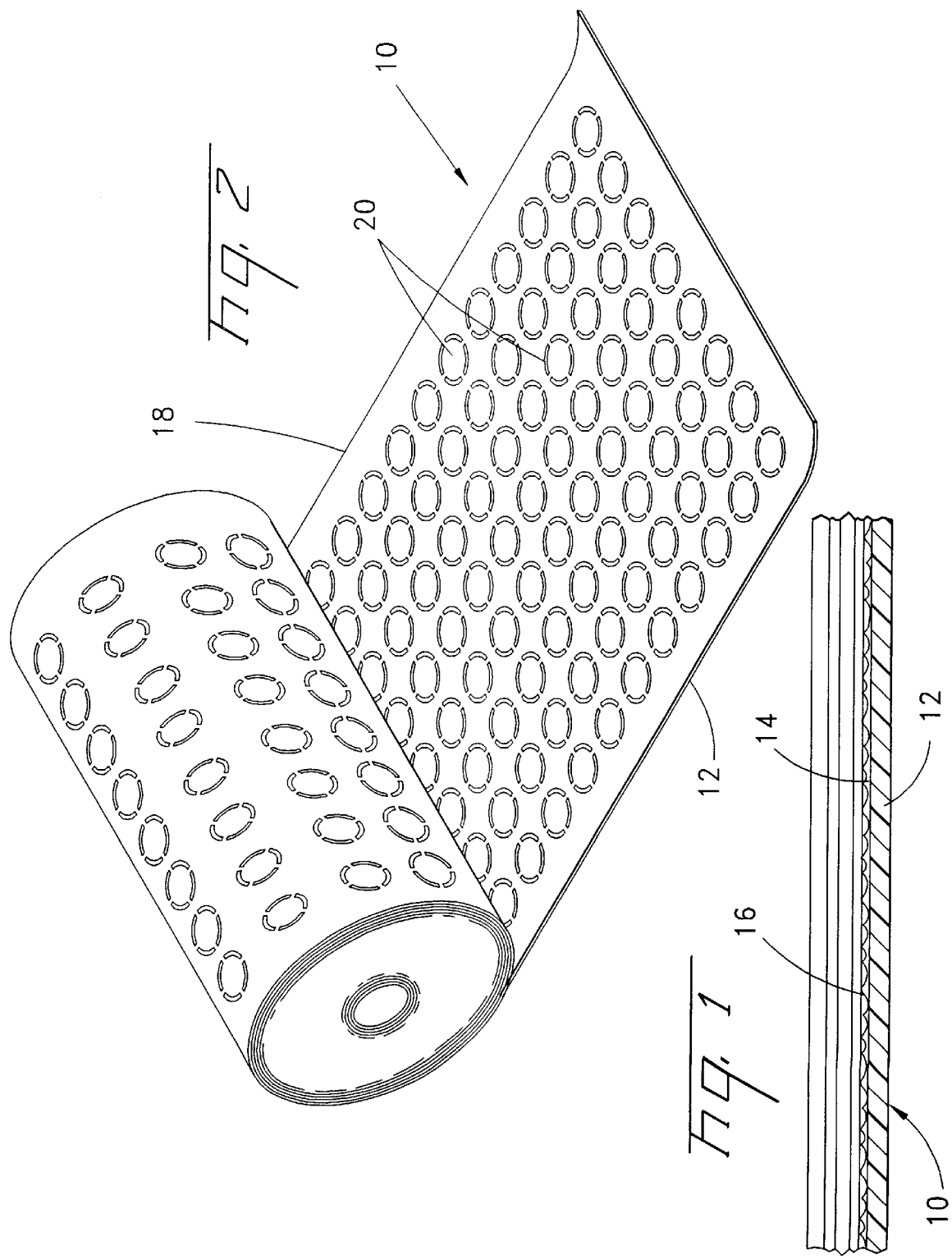

LANDSCAPE CONTROL FABRIC WITH MUCILAGE

FIELD OF THE INVENTION

This invention is directed to the field of laminated gardening and planting mats incorporating plural layers of timed feeding products designed for a variety of vegetation.

BACKGROUND OF THE INVENTION

The present invention relates to a landscaping control fabric in the form of a mat that may be trimmed or cut to provide trees, shrubs, flower beds, etc. with timed release nutrients and other products for healthy growth and weed control. Additionally, a feature of the mat is an array of prepunched holes to assist in planting flowers, and the like.

Planting accessories in the form of a ground covering mat are well known commercially, and are taught in the prior art. Such planting accessories, as described in the prior art, are reflected in the following U.S. Patents:

(a) U.S. Pat. No. 5,421,123, to Sakate et al., discloses a vegetation mat which prevents freezing or flow-away of vegetation material without the need for stretching a separate net. The mat comprises a layer of vegetation material selected from the group consisting of soil improvement material, fertilizer, organic material, vegetation seeds and combinations thereof, a front and back sheet, which are capable of being at least partly decomposed and are coupled together to wrap the vegetation material. A net having a mesh size permitting the budding and growth of the vegetation seeds, is provided on the front surface of the front sheet.

(b) U.S. Pat. No. 5,396,731, to Byrne, teaches a mulch pad in preformed or pourable state comprising a mixture of rubber granules, buffings, and fibers ground from used tires, a curable binder and coloring, catalyst and antigloss agents. Also, a U.V. light stabilizer and antioxidants can be added to the mixture. A preformed pad has a central trunk receiving aperture and a partially pre-cut, relockable slit which can be torn and then rejoined for disposition of the pad around a tree. The pad is porous and prevents moisture and air transmission to underlying root system while insulating them.

(c) U.S. Pat. No. 5,309,673, to Stover et al., relates to a plant carrier for cultivating plants, seedlings, seeds, or the like, and has at least one layer of plant-growing material, an upper layer of natural fiber, and a lower layer of natural fiber sandwiching the plant growth layer in between. Thread means are provided for stitching and sewing the upper and lower natural fibers layers together is improved by natural fiber layer means combining the upper and lower fiber layers along at least portions of their edges to produce a hose-like cover that is filled with said plant layer of plant growing material.

(d) U.S. Pat. No. 5,274,951, to Besing, discloses a seed delivery device comprising a flat, flexible seed of bio-degradable material, a plurality of apertures formed through said sheet to present a waffle-like configuration to allow passage of water and sun therethrough, and a plurality of seeds bonded to one side of said sheet between said apertures. The sheet may be positioned adjacent the earth to cause growth of the seed through the sheet. The seed delivery device is formed of papermache, wherein said apertures are rectangular, symmetrically positioned relative to one another, and tapered. The seed delivery device also comprises nutrients impregnated into said sheet.

(e) U.S. Pat. No. 4,283,880, to Fjeldsa teaches a peat paper used to improve the quality of the soil in connection with planting, sowing or weed-control. The paper consists of peat fibers, cellulose fibres, and a bonding agent. The disclosure also teaches the method of producing said peat paper. The peat paper is characterized in that in a lower layer the cellulose fibres support the peat fibres and in that the cellulose fibres and peat fibres are bonded together by means of the bonding agent in a dry-formation process so as to form paper-like sheets or webs. The resulting peat paper is soft and owing to its method of production controlled amounts and/or layers of additives, such as fertilizers, seeds, hormones, and similar additives may be incorporated into the paper.

(f) U.S. Pat. No. 4,272,919, to Schmidt, relates to seed carriers which are preferably in the form of seed-containing sheets to be laid out on the ground. The seed carriers are produced continuously on a large scale by the utilization of forming wire machines commonly used for papermaking. The seed carrier is formed in part of a peat material which is fibre-graded, in that colloids and small particles have been removed, and/or of a peat material having a degree of humidification of 1 to 3 according to von Post's scale, and in part of a fibre material interconnecting the peat fibres. The seed carrier according to the invention may be used for growing all kinds of crop, preferably in growing plants in dry districts, for instance desert areas, where it will form a cover which promotes the retention of moisture in the underlying soil.

(g) U.S. Pat. No. 4,190,981, to Muldner, discloses a laminated mat for growing lawns or other vegetation on soil comprising a base sheet of water pervious, biodegradable web material. Joined to the base sheet by an adhesive binder is a bed of seeds and dried, compressed peat particles. Secured to the bed of seeds and peat particles is an upper laminate comprising a fibrous, porous veil which protects and retains the bed therebelow. The upper veil is water pervious to pass water therethrough to the bed of peat particles and seeds. The bio-degradable veil also easily expands to retain the wet, expanded peat particles and the seeds entrained by the peat particles and the veil.

While the above prior art offers a number of approaches to providing growth products for different vegetation, none provide the unique custom and selectability available by the product hereof. The manner by which the features of this invention achieves the uniqueness will become more evident in the following description, particularly when read in conjunction with the accompanying drawings.

SUMMARY OF THE INVENTION

This invention relates to a custom designed, laminated landscape fabric for use in time feeding a mixed and selected variety of vegetation growth and control products. The landscape fabric comprises a base layer of a water pervious fabric mesh, having an upper surface containing an adhesive-type layer, and a plurality of vegetation growth products, each product contained individually on a separate layer of mucilage secured in a laminated fashion onto said adhesive-type layer. The various vegetation growth and control products may be selected from the group of products consisting of fertilizers, fungicides, water saver crystals, plant foods, and pre-emergent and post-emergent weed killers. The respective products may be applied as a powder coating or liquid sprayed on the mucilage layer. The landscape fabric further includes an array of prepunched holes for planting a controlled flower bed.

Accordingly, an object of this invention is the provision of a custom designed landscape fabric that may be used for different landscaping projects, whether trees, shrubs, or flowers.

Another object hereof is the provision of a timed release landscape and feed control fabric that may be cut and trimmed for the landscaping project.

A further object of this invention is a vegetation growth and control landscape fabric that includes prepunched holes for customizing and planting a flower garden.

These and other objects of the invention will become apparent, particularly to those skilled in the art, from the following specification.

BRIEF DESCRIPTION OF DRAWINGS

FIG. 1 is a partial sectional view illustrating the laminated landscaping mat of this invention, to provide timed release of vegetation enhancing products for trees, shrubs, and the like.

FIG. 2 is a perspective view showing a preferred form for the landscaping mat, which in this case is a roll to be cut or trimmed as required for the vegetation.

DETAILED DESCRIPTION OF PREFERRED EMBODIMENT

Figure 3:
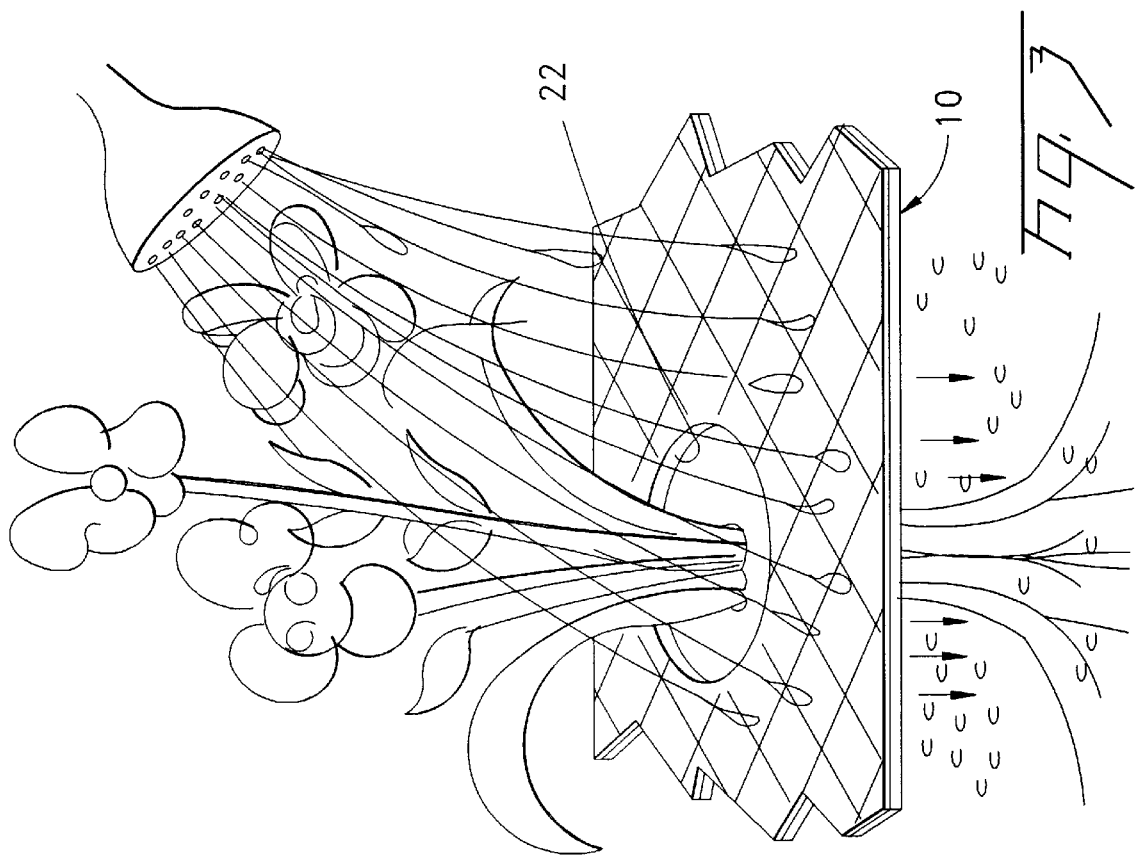
FIG. 3 is a perspective view illustrating an exemplary application of the landscaping mat hereof to a plant, where the vegetation enhancing products are being time released by watering.

The present invention is directed to a custom designed landscaping fabric to provide growth enhancing and control of time releasing products for a variety of vegetation, such as trees, shrubs, flowers, and the like. The landscaping fabric will now be described with regard to the several Figures, where like reference numerals represent like components or features throughout the various views.

FIG. 1 illustrates the laminated or composite landscaping fabric 10 comprising a base layer 12 consisting of a landscape control fabric, as known in the art, formed of a water pervious, tight mesh that allows water to pass while preventing weeds from passing up through the mesh. The upper surface 14 of the base layer 12 contains an adhesive or tacky layer 16. Disposed above, and to be secured by the tacky layer 16, are plural layers of growth enhancing and control products for the selected vegetation.

One advantage of the landscaping fabric of this invention is the ability to customize or design the landscaping fabric to meet one's gardening and landscaping needs. A flower bed, for example, has different needs from those of shrubs or trees. Accordingly, the landscaping fabric includes plural growth enhancing and control products selected from the group consisting of fertilizers, fungicides, water saver crystals, vegetation foods, pre-emergent weed killers, such as may be used in the Spring, and post-emergent weed killers that may be needed in the fall. Water saving crystals, as known in the art, are products that retain and time release water to the vegetation. A commercial product is sold under the trademark, TERRA-SORB, hydrogel crystals sold by Plant Health Care, Inc.

The various growth enhancing and control products may be incorporated into the landscaping fabric 10 by applying the selected products either in powder form, or in liquid form, onto a mucilage surface, then applied to the tacky surface 16.

FIG. 2 illustrates a preferred form for the landscaping fabric 10, where a potential commercial form may be a roll 18 of a fixed width, and a length of a discrete dimension, such as 50 feet. Further, the landscaping fabric 10 may include an array of prepunched holes 20 for planting to allow the user to design a flower bed, for example.

Figure 4:
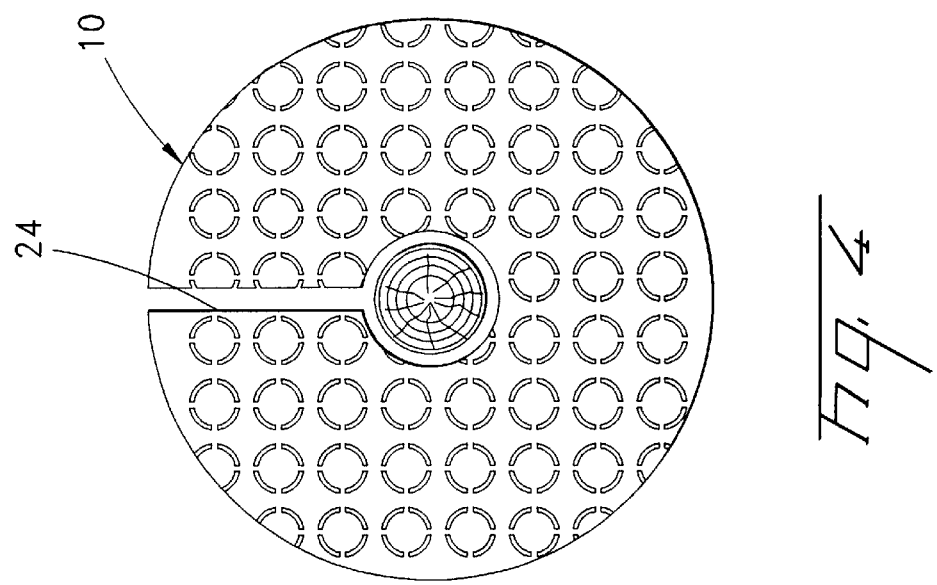
FIG. 4 is a top view of another application of the mat of this invention, where the mat is slotted to encircle a tree.

FIGS. 3 and 4 illustrates examples of how the landscaping fabric may be cut or trimmed to meet the needs of the selected vegetation. The fabric may be provided with a cut-out 22 to encircle a plant (FIG. 3), or slotted 24 to encircle a tree (FIG. 4). For specific applications, the landscaping fabric may be manufactured in various shapes and sizes.

It is recognized that variations, changes and modifications may be made to the landscaping fabric of this invention, such as in the selection and arrangements of the growth enhancing and control products on the base layer. Accordingly, no limitation is intended to be imposed thereon except as set forth in the accompanying claims.

What is claimed is:

1. A custom designed landscaping fabric to provide growth enhancing and control of time releasing products to vegetation, said landscaping fabric comprising:
   (a) a water pervious mesh layer with an upper surface, and a lower surface for contacting the growth;
   (b) an adhesive layer on said upper surface; and,
   (c) plural layers of a mucilage based medium containing vegetation, growth and control products, where said products comprise a first layer containing a fertilizer, a second layer of water saving crystals, a third layer of a fungicide, and a fourth layer of a pre-emergent weed killer, where said fourth layer is in direct contact with said adhesive layer.

2. The landscaping fabric according to claim 1, wherein at least one of said products is applied in powder form to said mucilage based medium.

3. The landscaping fabric according to claim 1, wherein at least one of said products is applied in a water soluble liquid to said mucilage based medium.

4. The landscaping fabric according to claim 1, wherein said landscaping fabric is in the form of a roll of discrete length.

5. The landscaping fabric according to claim 1, wherein said landscaping fabric includes an array of prepunched holes to facilitate an organized planting of a garden.

* * * * *